United States Patent [19]

Fukuda et al.

[11] 4,125,892
[45] Nov. 14, 1978

[54] SYSTEM FOR MONITORING OPERATION OF DATA PROCESSING SYSTEM

[75] Inventors: Shigeru Fukuda, Zushi; Satoru Narita, Yokohama; Makoto Maejima, Zushi; Masaru Homma, Yokosuka, all of Japan

[73] Assignee: Nippon Telegraph and Telephone Public Corporation, Tokyo, Japan

[21] Appl. No.: 811,241

[22] Filed: Jun. 29, 1977

Related U.S. Application Data

[63] Continuation-in-part of Ser. No. 566,248, Apr. 9, 1975, abandoned.

[30] Foreign Application Priority Data

Apr. 17, 1974 [JP] Japan .................................. 49/42865

[51] Int. Cl.² ............................................ G06F 11/06
[52] U.S. Cl. ................................................. 364/200
[58] Field of Search ... 364/200 MS File, 900 MS File; 235/301, 302.3, 304, 307, 308, 312; 179/18 ES; 119/175.2 R

[56] References Cited

U.S. PATENT DOCUMENTS

| | | | |
|---|---|---|---|
| 3,654,603 | 4/1972 | Gunning | 235/307 |
| 3,704,363 | 11/1972 | Salmassy | 364/200 |
| 3,763,474 | 10/1973 | Freeman | 364/200 |
| 3,778,767 | 12/1973 | Carlyle | 235/304 |
| 3,818,458 | 6/1974 | Deese | 364/200 |
| 3,876,987 | 4/1975 | Dalton | 364/200 |
| 3,898,621 | 8/1975 | Zelinski | 364/200 |
| 4,030,072 | 6/1977 | Bjornsson | 364/200 |

Primary Examiner—James D. Thomas
Attorney, Agent, or Firm—Burgess, Ryan and Wayne

[57] ABSTRACT

In a data processing system comprising a plurality of systems each including a plurality of console type typewriters for establishing communications pertaining to data processing operations between an operator and the system, the communication information which is entered into and derived from a central processing unit in each system by the console type typewriter is stored in a character buffer unit corresponding to the console type typewriter in a monitor transfer control unit, and a buffer scanning unit scans the character buffers to transfer the contents therein into a statistical analyzer or processing unit so that communication information may be automatically analyzed and summarized to obtain the data per day or month required for determining whether or not the data processing system has been effectively operated.

5 Claims, 8 Drawing Figures

SYSTEM FOR MONITORING OPERATION OF DATA PROCESSING SYSTEM

This application is a continuation-in-part of prior copending application Ser. No. 566,248, filed Apr. 9, 1975, now abandoned, and assigned to the assignee of the instant application.

BACKGROUND OF THE INVENTION

The present invention relates to a data processing system, and more particularly, a system for monitoring the information required for operating and controlling the data processing system.

Of a variety of modes of operation of data processing systems, the batch data processing method has been developed in order to develop software and to debug programs. A user must present to an operator a job entry or request card describing (1) a job request accepted time, (2) name, office and telephone number, (3) user's registration number, (4) machine or system to be used, (5) time allocation, (6) operating system to be used, e.g. job, program, user's input and output, (7) data handling medium to be used, (8) procedures and (9) time when job is completed. With this card the operator effects the following communications with a data processing system through a console type typewriter:

(1) job starting or completion message to the system,
(2) job starting or completion message from the system,
(3) job procedure (execution mode) message to the system, and
(4) malfunction message (including erratic operation) from the system.

In order to increase the effective use of the data processing system by operating and controlling it in the manner described above, the operator must arrange the job schedule and must operate and control the system in an optimum manner. However, in general, the data processing system is not fully used. In order to attain the effective use of the data processing system, not only the optimum time allocation is needed but also the data control system must be operated and controlled based upon data pertaining to the actual utilization of the system.

Until now, data pertaining to the operation of the data processing system has been manually collected from the software or job cards, the central processing unit execution time and/or the communication information exchanged between the operator and the system in the manner described above being based upon information written on the job entry or request card.

The collected data has been manually analyzed to prepare statistical utilization data. Thus, the greater the number of data processing systems to be operated and controlled becomes, the more difficult and complicated the process for collecting, analyzing and summarizing the data pertaining to the operation of the data processing system becomes. For instance, there has been devised and demonstrated a data processing system consisting of two subsystems, one system being used for real time service and remote batch service while the other system is used for remote debugging or center batch service. In this system, main and auxiliary console type typewriters are provided for each subsystem, so that communication between the subsystem and the operator may be established. That is, the console type typewriters print out the operation records, malfunctions, and statistical data such as operating time, all required for the control of the data processing system. Even a data processing system consisting of two subsystems usually has more than four console type typewriters, and the job control information is distributed among four console type typewriters so that is is difficult to manually collect the required data and analyze the same for statistical purposes. If the number of data processing systems is increased, it becomes virtually impossible to manually collect and analyze the required data.

SUMMARY OF THE INVENTION

Accordingly, one of the objects of the present invention is to provide an arrangement for monitoring the operation of a data processing system shared by a plurality of remote terminals by automatically collecting the communication information exchanged between each of the connected console type typewriters and the system, analyzing the collected information and summarizing the data pertaining to the operation of the data processing system for the fullest possible use of said data processing system.

To this end, briefly stated, the present invention provides a system for monitoring the operation of a data processing system comprising a plurality of systems each comprising (i) a central processing unit, (ii) a plurality of console type typewriters for entering communication information into the central processing unit and deriving communication information therefrom, (iii) a plurality of remote terminals to which is transmitted through a communication control equipment, the data processed by the central processing unit, (iv) a system supervisor and control unit including a cathode-ray tube for supervising and controlling the operation of the data processing system; (v) a monitor transfer control unit branching the communication information exchanged between the central processing unit and each console type typewriter, and (vi) a statistical analyzer or processing unit for receiving the communication information from the monitor transfer control unit, analyzing the received communication information, automatically summarizing the data pertaining to the total operation time per day or month of the data processing system and transmitting the data to the remote terminal equipment or the system supervisor and control unit for supervising and controlling the data processing system.

DESCRIPTION OF THE PREFERRED EMBODIMENTS

Figure 1:
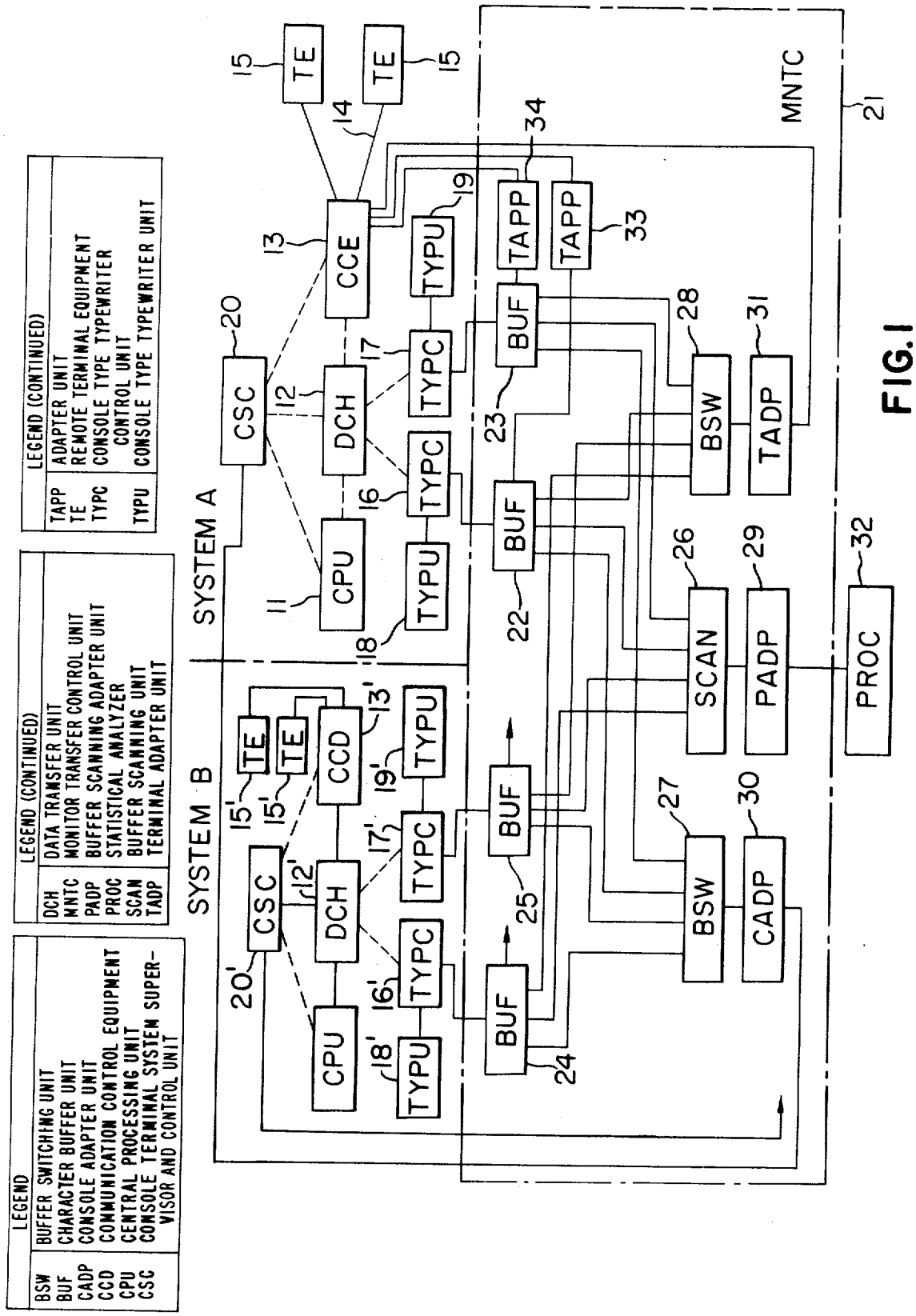
FIG. 1 is a block diagram of two data processing systems incorporating a system in accordance with the present invention for monitoring the operation of the data processing systems.

Referring to FIG. 1, in data processing systems A and B central processing units (CPU) 11 and 11' are connected through to data transfer or channelling units 12 and 12' (DCH), communication control equipment (CCE) 13 and 13' and communication lines 14 to remote terminal equipment (TE) 15 and 15'. The data transfer or channelling units 12 and 12' are connected through console type typewriter control units 16, 17, 16' and 17' to console type typewriters 18, 19, 18' and 19'. In order to monitor and control the whole system, the data processing systems A and B are provided with system supervisor and control units 20 and 20' (CSC) interconnected to the central processing units 11 and 11', the data transfer or channelling units 12 and 12' and the communication control equipment 13 and 13'.

In order to monitor if the data processing systems A and B are being effectively utilized, a monitor transfer control unit 21 and a statistical analyzer or processing unit (PROC) 32 are provided. The monitor transfer control unit 21 comprises character buffer units (BUF) 22-25, a buffer scanning unit (SCAN) 26, buffer switching units (SW) 27 and 28 and adapter units (PADP, CADP,TADP, TAPP and TAPP) 29, 30 31, 33 and 34. Communication information originated from the console type typewriters 18, 19, 18' and 19' in the data processing systems A and B is transferred character by character through the console type typewriter control units 16, 17, 16' and 17' to the character buffer units 22-25. The buffer scanning unit 26 has the function of periodically scanning the character buffer units 22-25 and transferring the contents therein to the statistical analyzer 32 through the adapter unit 29. In response to an instruction from the system supervisor and control unit (CSC) 20, the buffer switching unit 27 selects a desired buffer unit and transfers the contents therein into the system monitor control unit 20 through the adapter unit 30. In response to an instruction from the desired terminal equipment 15, the buffer switching unit 28 selects the desired character buffer unit and transfers the contents therein into the desired remote terminal equipment 15 through the adapter unit 31 and the communication control equipment 13. Furthermore the adapter units 33 and 34 are used to connect the character buffer units 22 and 23 through the communication control equipment 13 to the specific terminal equipment.

Next the mode of operation will be described. When the operator enters the required job item by one of the console type typewriters 18, 19, 18' and 19' into the central processing unit 11 or 11', the console type typewriter prints out the response data transmitted from the central processing unit 11 or 11' in response to the input data. The intercommunication information between the console type typewriter and the central processing unit 11 or 11' is transferred through the console type typewriter control unit, connected to the console type typewriter used, to the character buffer unit. When a starting signal is transmitted from the statistical analyzer 32 to the buffer scanning unit 26 through the adapter unit 29, the buffer scanning unit 26 is energized to scan the character buffer units 22-25 sequentially. As a result, the communication information stored in the character buffer units 22-25 is sequentially transferred through the adapter unit 29 into the statistical analyzer 32, which in turn analyzes the communication information between the operating system and the operator which is monitored by the monitor transfer control device 21 in order to automatically summarize the data respecting system utilization time per day or month required for the control of the system. Whether or not the data processing systems A and B are being effectively utilized may be determined from the summarized data, and various possible methods for rationalization of the system control may be studied.

When it is desired to monitor the communication information originated from the main console type typewriter consisting of the blocks 16 and 18, the system supervisor and control unit 20 gives the buffer switching unit 27 the address information representative of the character buffer unit 22 so that the character buffer switching device 27 is connected to the character buffer unit 22 and the contents thereof, i.e., the communication information originated from the console type typewriters 16 and 18, are transferred into the system supervisor and control unit 20 to be displayed on a suitable display device such as a cathode-ray tube. In order to switch the monitoring, i.e. to monitor the communication information originated from other console type typewriters, the address information representative of the corresponding character buffer unit is transmitted to the buffer switching unit 27. The system supervisor and control unit 20 may accomplish the editing and hardcopying of the required information.

Next the mode of monitoring the communication information originated from the console type typewriters 17 and 19 from the remote terminal equipment 15 will be described. The address information designating the buffer unit 23 is transmitted in a conventional manner from the remote monitor equipment 15 through the communication line 14 and the communication control equipment 13 to the adapter unit 31. When this address information is received through the adapter unit 31 by the buffer switching unit 28, the latter interconnects between the character buffer unit 23 selected in response to the address information received and the adapter unit 31 so that the information stored in the character buffer unit 23 is first stored in the adapter unit 31 and then transmitted to the remote terminal equipment in a conventional data communication processing manner. That is, the adapter unit 31 has a character buffer capacity sufficient to follow the information transfer from the character buffer unit 23 so that the transmission of the monitor information to the remote terminal equipment 15 may be smoothly carried out. In order to monitor other console type typewriters the address information of the character buffer unit corresponding to the desired console type typewriter is transmitted from the remote terminal equipment 15 to the buffer switching unit 28 through the adapter unit 31.

In addition to the connection paths to the buffer scanning unit 26 and the buffer switching units 27 and 28, the character buffer units 22 and 23 have special connection paths to the remote equipment through the adapter units 33 and 34 so that the monitor information may be transmitted in a conventional data communication processing manner to the remote terminal equipment 15 corresponding to a specific console type typewriter. The same is true for the character buffer units 24 and 25.

Those parts of the devices and units making up the system shown in FIG. 1, which directly pertain to the present invention will now be described.

Figure 2A:
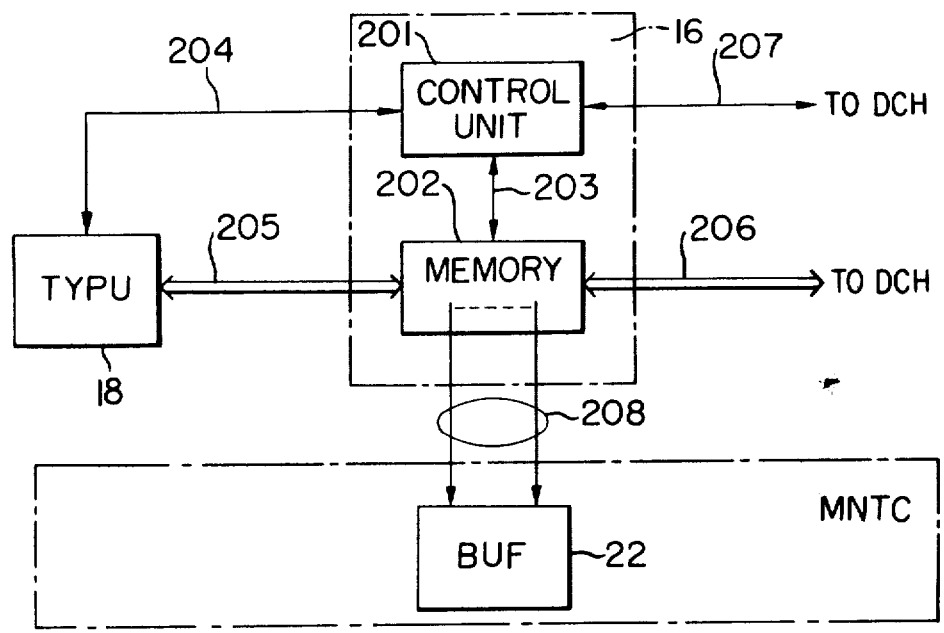
FIGS. 2(A) and 2(B) are block diagrams of two systems, respectively, for branching by the monitor transfer control device the communication information originated in a console type typewriter.
Figure 2B:
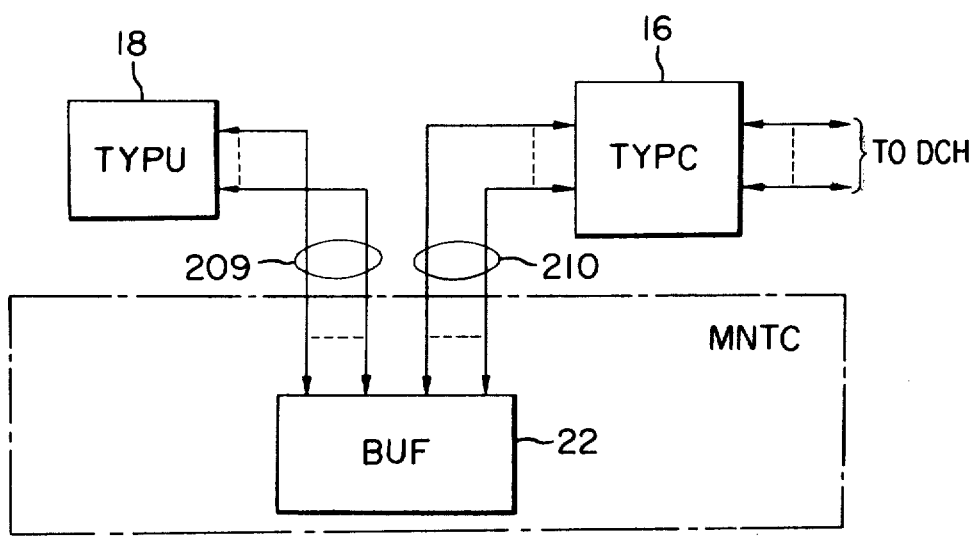

FIGS. 2(A) and 2(B) show two systems for transferring into the monitor transfer control device 21 the communication information between the operating system and the operator. In the system shown in FIG. 2(A), the information required for monitoring is transmitted from the console type typewriter unit, said unit and its control unit are connected to each other through the character buffer unit so that the information stored in the buffer unit may be utilized by the monitor transfer control device 21. More particularly, the console type typewriter control unit 16 shown in FIG. 2(A) comprises a control circuit 201 and a memory 202. In case of communication between the operator and the operating system under the control of the control circuit the job item information entered by the console type typewriter unit 18 is transmitted through a data line 207, the memory 202 and a data line 206 to the data transfer unit. The response information from the system is transmitted through the same path but in the opposite direction, and is printed out by the console type typewriter unit 18.

The control signal required for the data transmission is transmitted through the lines 203, 204 and 207 between the control circuit, the memory 202, the console type typewriter unit 18 and the data transfer unit (DCH). The memory 202 of the console type typewriter control unit 16 and the character buffer unit 22 are interconnected by a data branching line 208 so that the job item information and its response information which are temporarily stored in the memory 202 are transferred through the data branching line 208 into the character buffer unit 22 in the monitor transfer control device (MNTC) 21.

In the system shown in FIG. 2(B), the console type typewriter unit 18 is connected to the console type typewriter control unit 16 through an information line 209, the character buffer unit 22 in the monitor transfer control device 21 and an information line 210. Consequently the job item information entered by the console type typewriter unit 18 is transmitted through the character buffer unit 22 while the response information is transmitted to the console type typewriter unit 18 through the character buffer unit 22. Thus, the monitor transfer control device (MNTC) may directly utilize the contents of the character buffer unit 22.

Figure 3:
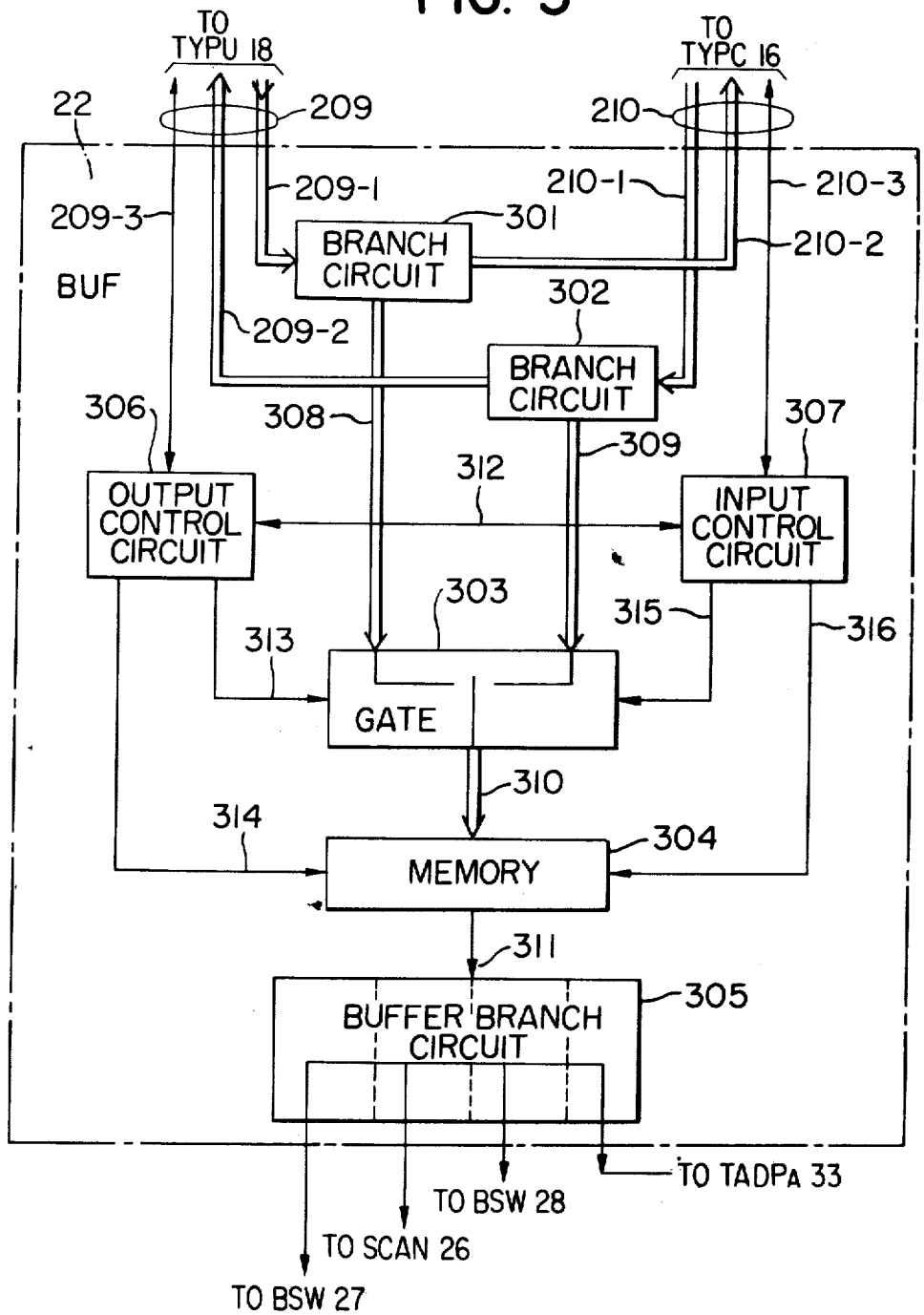
FIG. 3 is a detailed block diagram of a character buffer unit in the monitor transfer control device.

FIG. 3 shows one example of the character buffer unit 22 of the connection system shown in FIG. 2(B). Communication information from the console type typewriter unit (TYPU) 18 is transmitted through a data line 209-1, a signal branching circuit 301 and a data line 210-2 to the console type typewriter control unit (TYPC) 16. The response information from the system is transmitted through a data line 210-1, a signal branching circuit 302 and a data line 209-2 to the console type typewriter unit 18. The control signal required for the transmission of communication and response information is transmitted between the console type typewriter unit 18 and the control unit 16 through a signal line 209-3, an output control circuit 306, a signal line 312, and an input control circuit 307 and a signal line 210-3.

Communication information branched by the signal branching circuits 301 and 302 is transferred into a memory 304 through a signal gate 303. Writing operation is controlled by an output control circuit 306 and an input control circuit 307. That is, when the switching control signal from the output control circuit 306 is transmitted through a signal line 313 to the signal gate 303 and when the writing signal is applied to the memory 304, the communication information from the signal branching circuit 301 is transferred into the memory 304 through the signal gate 303 and the data line 310. When the input control circuit 307 transmits the switching control signal and the writing signal thorugh the signal lines 315 and 316, respectively, to the memory 304, communication information which is branched by the signal branching circuit 302 is transmited through the data line 390, the gate 303 and the data line 310 to the memory 301. A buffer branching circuit 305 branches the communication information transmitted through an output line 311 from the memory 304 to the buffer scanning unit 26, the buffer switching units 27 and 28 and the remote terminal equipment adapter unit 33.

Figure 4:
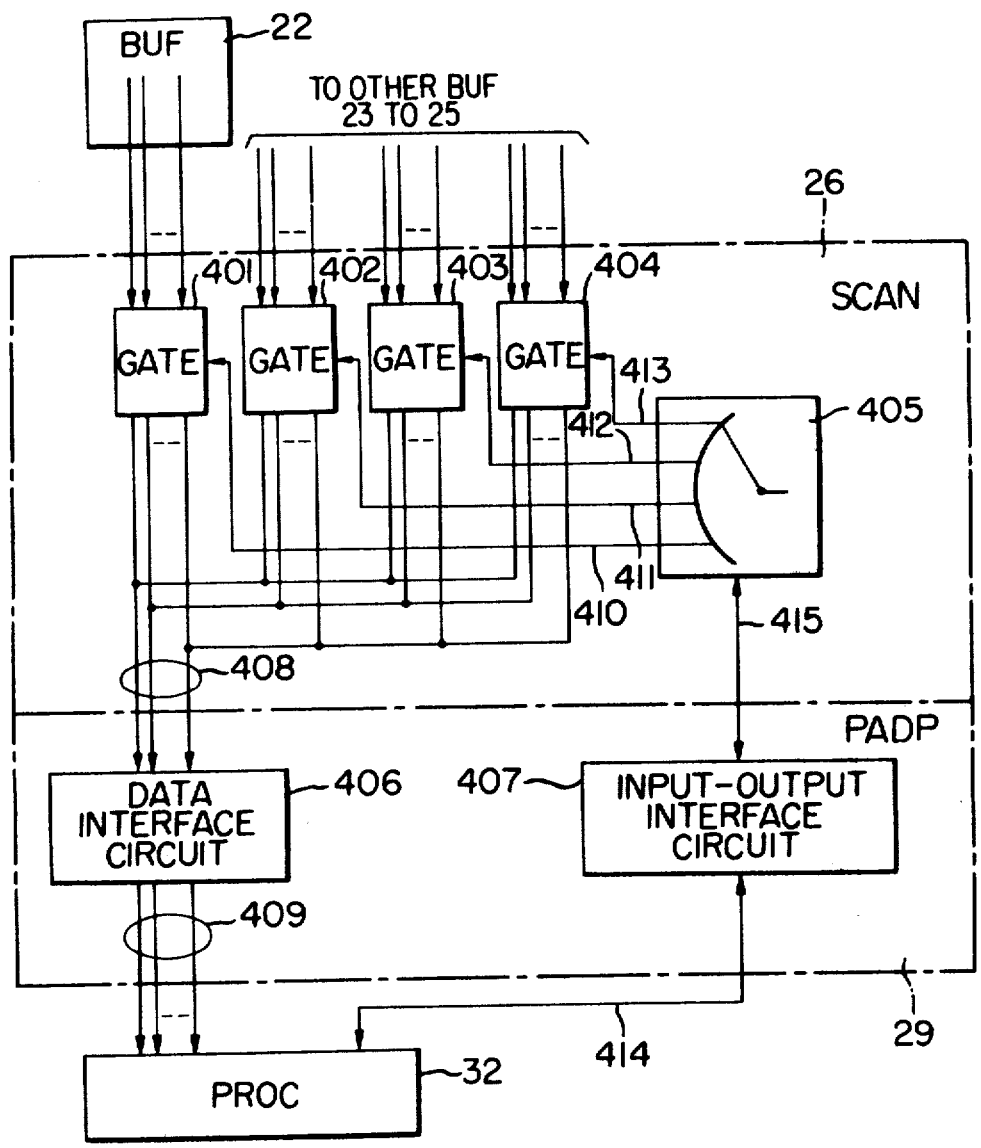
FIG. 4 is a detailed block diagram illustrating the information transmission system between the character buffer unit and the statistical analyzer or statistical processing unit.

FIG. 4 shows the interconnection among the buffer scanning unit 26, the adapter unit 29 and the statistical analyzer 32. When the statistical analyzer 32 is energized or started, it gives the starting signal to a scanning control circuit 405 in the buffer scanning unit 26 through a signal line 414, an input-output interface circuit 407 in the adapter unit 29 and a signal line 415. As a result, in response to the control signal transmitted from the scanning control circuit 405 through signal lines 410-413, respectively, gates 401-404 are sequentially energized so that the communication information stored in the character buffer units 22-25 is sequentially transmitted through the corresponding gates 401-404, a data transmission line 408, a data interface circuit 406 in the adapter unit 29 and a data transmission line 409 to the statistical analyzer 32. In synchronism with the scanning of the gates 401-404, the scanning control circuit 405 gives the gate number; that is, the address of the character buffer unit to the statistical analyzer 32 through the input-output interface 407 so that the statistical analyzer 32 may discriminate the communication information applied thereto.

The scanning control circuit 405 may be made up of, for instance, a clock signal generator, a counter for counting the output clock pulses from the generator, and a decoder for decoding the contents of the counter. In this case, the output lines from the decoder correspond to the signal lines 410-414, respectively. The gate number may be expressed by.the number of clock pulses counted by the counter.

Figure 5:
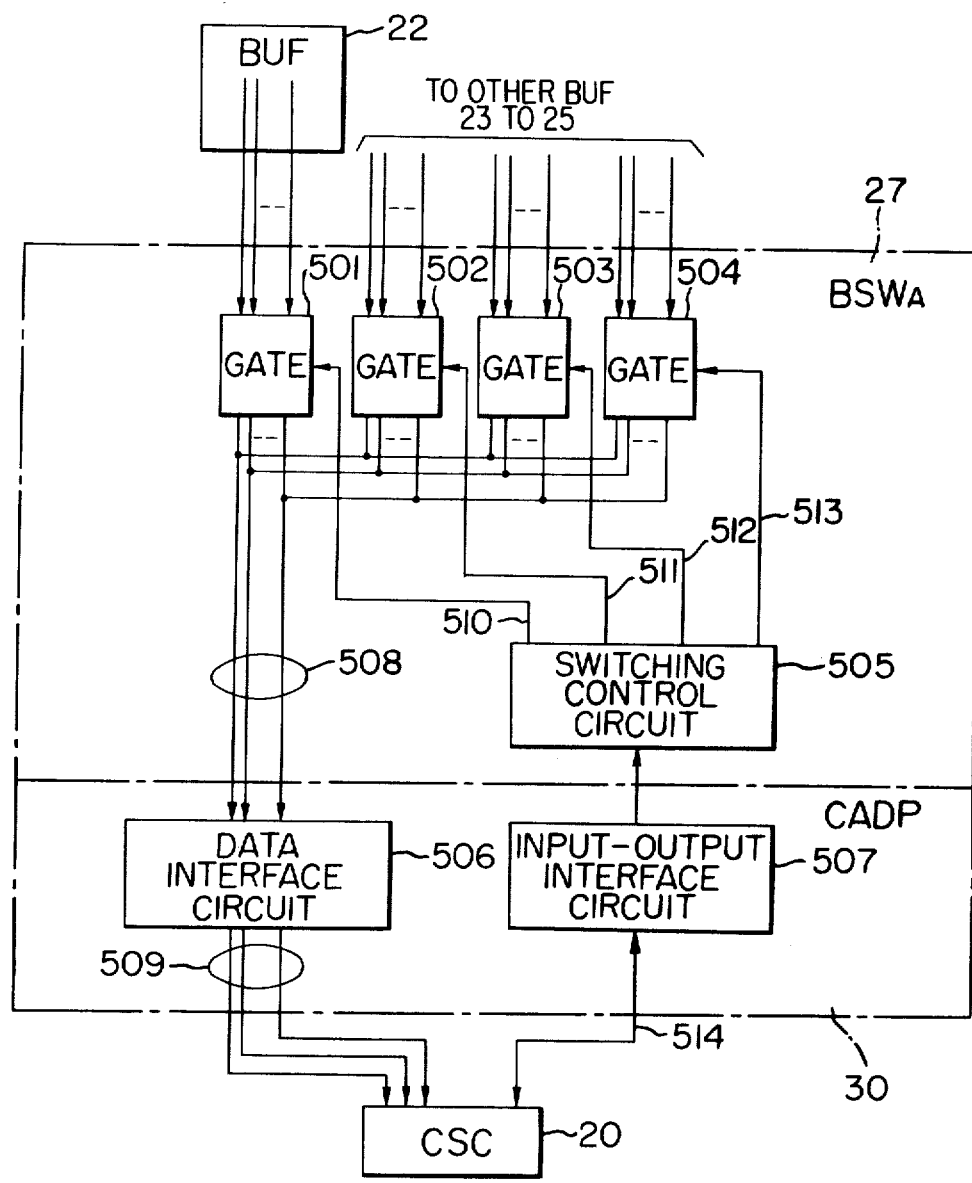
FIG. 5 is a detailed block diagram illustrating the information transmission system between the character buffer unit and the system supervisor and control unit.

Next referring to FIG. 5, the character buffer units 22-25 the buffer switching unit 27, the adapter unit 30 and the system supervisor and control unit will be described in more detail. Assume that the system supervisor and control unit 20 monitors the communication originated from the console type typewriter consisting of the blocks 16 and 18. The system supervisor and control unit 20 transmits the address of the character buffer unit 22 through an input-output interface circuit 507 of the adapter unit 30 to a switching control circuit 505 in the buffer switching unit 27. The switching control circuit 505 includes a decoder (not shown) which decodes the address of the character buffer unit so that a signal line 510 is selected. As a result, a gate circuit 501 is energized so that the communication information stored in the character/buffer unit 22 is transmitted through the gate circuit 501, a data line 508, an data interface circuit 506 in the adapter unit 30 and a data transmission line 509 to the system supervisor and control unit 20.

Figure 6:
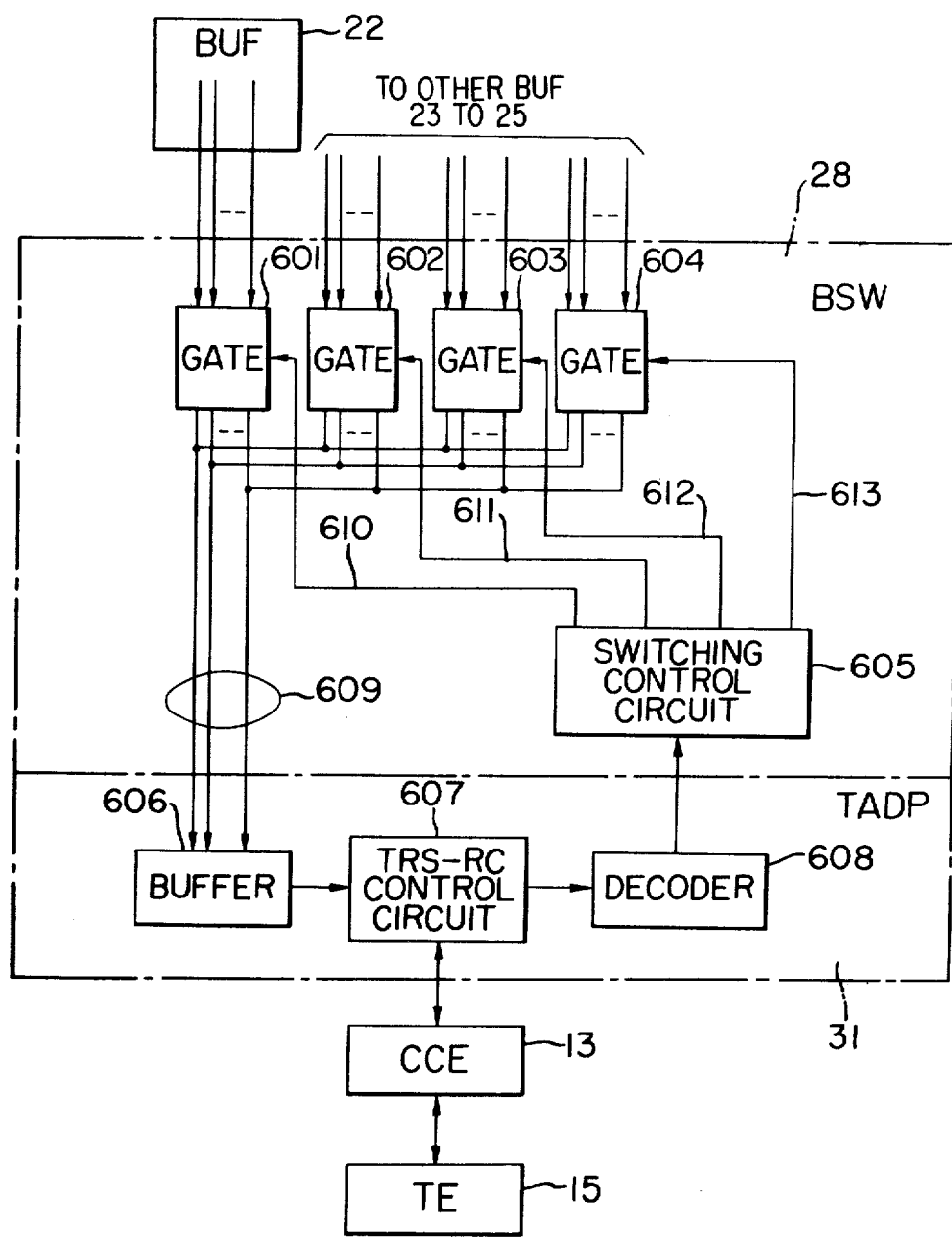
FIG. 6 is a detailed block diagram illustrating the information transmission system between the character buffer and the desired remote terminal equipment.

FIG. 6 shows the transmission system for the character buffer units 22-25, the buffer switching unit 28, the adapter unit 31, the communication control equipment 13 and the remote terminal equipment 15. In order to monitor a desired console type typewriter from the remote terminal equipment 15, the address of the character buffer unit corresponding to the console type typewriter to be monitored is transmitted from the remote terminal equipment 15 through the communication control equipment 13 to a transmission-reception control circuit 607 of the remote terminal equipment adapter unit 31 in a conventional data communication processing manner. The address of the character buffer unit is decoded by a decoder 608, and is transmitted to a switching control circuit 605 in the buffer switching unit 28. Assume that the remote terminal equipment 15 has transmitted the address of the character buffer unit 22. The, the switching control circuit 605 selects s signal line 610 so that a gate 601 is energized. As a result, only the communication information stored in the character buffer unit 22 is transferred in a conventional data communication processing manner through the gate 601 onto a data transmission but 609 and then into a transmission buffer 606 in the remote terminal equipment adapter unit 31. Thereafter the communication information is transmitted in a conventional data communication processing manner to the remote terminal equipment 15 under the control of the transmission-reception control circuit 607.

Figure 7:
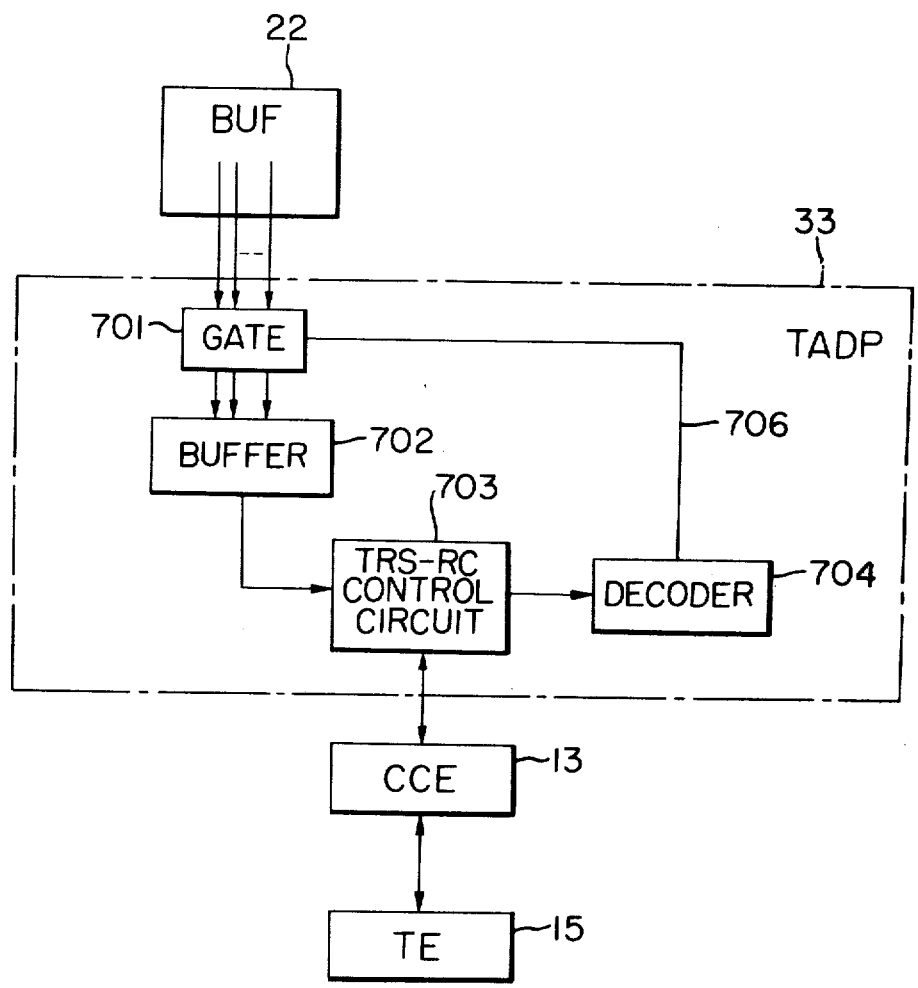
FIG. 7 is a detailed block diagram illustrating the information transmission system interconnected between the desired character buffer unit and the desired remote terminal equipment through a direct path.

FIG. 7 shows one example of the adapter unit 33 interconnecting between the character buffer unit 22 and the remote terminal equipment 15. The starting signal from the remote terminal equipment 15 is transmitted through the communication control equipment 13 to a transmission-reception control circuit 703 in the adapter unit 33, and is decoded by a decoder 704. The output from the decoder is transmitted through a signal line 706 to a gate circuit 701 to energize the same so that the communication information stored in the character buffer unit 22 is transmitted through the gate circuit 701 to a transmission-reception buffer 702. Thereafter the communication information is transmitted in a conventional data communication processing manner and under the control of the transmission-reception control circuit 703 to the remote terminal equipment 15.

The term "communication information" as herein employed comprises input-output information transferred between a data processing system and console type typewriters.

The console type typewriters utilize (i) hardware related communication information to control the start or stop of the data processing systems, the cancellation of errors in the hardware, the operation of the power source and the display of a state of the hardware; and (ii) software related communication information to indicate the program which operators are to execute, the share of the input-output device required in the execution of the program, the situation of the execution of the program and the situation of the operation of the input-output device.

When an operator executes each job of one or more users and terminates the execution of the job, communication information is exchanged between the data processing system and the operator via the console type typewriter. Also, the described communication information relating to the display of a state of the hardware, the state of the execution of each job and the state of the operation of the device is printed by the console type typewriter.

This communication information is transmitted to the analyzer 32 by the monitor transfer control unit 21 and used for statistical processing. But, the communication information used for statistical processing is only the information required for monitoring the operation of the data processing system.

There is described below a concrete example of processing communication information of the console type typewriter 18 in the system A and the console type typewriter 18' in the system B. The information from each console type typewriter includes identification information identifying information of the data processing system or the operator, and time information identifying the time of day each item of communication information is outputed from each processer.

This communication information is printed as follows:

| System A console type typewriter 18 | | | System B console type typewriter | | |
|---|---|---|---|---|---|
| command code | time information | content of message | command code | time information | content of message |
| /·BC, ; CD, | 09:10, 09:11, | *** --- *** --- | /·BC, ; CD, | 09:40, 09:42, | *** --- *** --- |
| \| | \| | | \| | \| | |
| ;DY, /DX, ;DZ, | 10:52, 10:53, 10:53, | *** --- *** --- *** --- | ;DY, /DX, ;DZ, | 12:15, 12:20, 12:20, | *** --- *** --- *** --- |

( / --- the codes of the operator side
 ; --- the codes of the system side )

These items of communication information are transmitted to the analyzer 32 by the monitor transfer control unit 21. When the monitor transfer control unit 21 transmits the communication information to the analyzer 32 by the signal line 409 in FIG. 4, since the codes identifying the related system and the console type typewriter are transmitted in synchronization with the above codes by the signal line 414 of FIG. 4, the analyzer 32 generates information to be displayed or printed in each console type typewriter of the data processing system.

Therefore, when these items of information are identified and processed in the analyzer, the job execution time in the system A is from 9:10 to 9:53 and the time in the system B is from 9:40 to 12:20. Thus, the execution time for each job in each system can be easily calculated.

It is to be understood that the above description is illustrative rather than restrictive and that variations, alternations and/or modifications may be made without departing from the spirit of the present invention.

What is claimed is:

1. A system for monitoring the operation of a data processing system comprising
   (A) a plurality of data processing systems each comprising
      (a) a central processing unit,
      (b) a plurality of console type typewriters connected through a data transfer unit to said central processing unit for transferring communication information to and from said central processing unit,
      (c) a plurality of remote terminals connected to said central processing unit through a communication control equipment, and
      (d) a console terminal system supervisor and control unit connected to said data transfer unit for supervising and controlling each of said plurality of data processing systems;
   (B) a monitor transfer control unit comprising
      (a) a plurality of character buffer units respectively connected to said plurality of console type typewriters, and
      (b) a buffer scanning unit for sequentially scanning said character buffer units; and
   (C) a statistical analyzer connected to said buffer scanning unit for receiving the communication information from said monitor transfer control unit, analyzing the received communication information and automatically summarizing the data required for effective and efficient utilization of said data processing systems.

2. A system as set forth in claim 1 wherein said monitor transfer control unit further comprises
   (a) a buffer switching unit connected to said console terminal system supervisor and control unit through a system-supervisor-and-control-unit adapter unit,
   said buffer switching unit being responsive to a console-type-typewriter designation instruction transmitted from said system supervisor and control unit for selecting a designated character buffer unit and connecting the same to said adapter unit.

3. A system as set forth in claim 1 wherein said monitor transfer control unit further comprises a buffer switching unit connected to said communication control equipment through a remote-terminal-equipment adapter unit, said buffer switching unit being responsive to a console-type-typewriter designation instruction transmitted from the remote terminal equipment for selecting the character buffer unit corresponding to the designated console type typewriter and connecting said character buffer unit to said adapter unit.

4. A system for monitoring the operation of a data processing system comprising
   (A) a plurality of data processing systems each comprising
      (a) a central processing unit,
      (b) a plurality of console type typewriters connected through a data transfer unit to said central processing unit for transferring communication information to and from said central processing unit,
      (c) a plurality of remote terminals connected to said central processing unit through a communication control equipment, and
      (d) a console terminal systemmm supervisor and control unit connected to said data transfer unit for supervising and controlling each of said plurality of data processing systems;
   (B) a monitor transfer control unit comprising
      (a) a plurality of character buffer units respectively connected to said plurality of console type typewriters,
      (b) a buffer scanning unit for sequentially scanning said character buffer units, and
      (c) a first adapter unit for transmitting the output from said buffer scanning unit;
   (C) a statistical analyzer connected to said buffer scanning unit through said first adapter unit for receiving communication information from said first adapter unit, analyzing the received communication information and automatically summarizing the data required for the effective operation control of said data processing systems;
   (D) a first buffer switching unit responsive to a first consoletype-typewriter designation instruction transmitted from said console terminal system supervisor and control unit for connecting said system supervisor and control unit to the character buffer unit designated by said first instruction through a second adapter unit; and
   (E) a second buffer switching unit responsive to a second console type typewriter designation instruction transmitted from the remote terminal equipment for connecting said remote terminal equipment to the character buffer unit designated by said second instruction through a third adapter unit.

5. A system as set forth in claim 1 wherein said monitor transfer control unit further comprises
   a remote-terminal-equipment adapter for normally interconnecting between said communication control equipment and a specific remote terminal equipment.

* * * * *

UNITED STATES PATENT OFFICE
CERTIFICATE OF CORRECTION

Patent No. 4,125,892     Dated November 14, 1978

Inventor(s) Shigeru Fukuda, et al

It is certified that error appears in the above-identified patent and that said Letters Patent are hereby corrected as shown below:

Column 6, line 7 : "thorugh" should be --through--

Column 10, line 7 : "systemcomprising" should be --system comprising-- line 40: "consoletype-typewriter" should be

--console-type-typewriter--

Signed and Sealed this

Twenty-second Day of May 1979

[SEAL]

Attest:

RUTH C. MASON
Attesting Officer

DONALD W. BANNER
Commissioner of Patents and Trademarks